United States Patent [19]

Kaneko et al.

[11] Patent Number: 4,909,602

[45] Date of Patent: Mar. 20, 1990

[54] LIQUID CRYSTAL DISPLAY AND METHOD OF DRIVING THE SAME

[75] Inventors: Yoshiyuki Kaneko, Kokubunji; Akira Sasano, Tokyo; Toshihisa Tsukada, Musashino, all of Japan

[73] Assignee: Hitachi, Ltd., Tokyo, Japan

[21] Appl. No.: 183,620

[22] Filed: Apr. 19, 1988

[30] Foreign Application Priority Data

Apr. 20, 1987 [JP] Japan .................................. 62-95127
Apr. 20, 1987 [JP] Japan .................................. 62-95128

[51] Int. Cl.$^4$ ............................................. G02F 1/13
[52] U.S. Cl. ..................................... 350/333; 350/332; 340/784
[58] Field of Search ..................... 350/332, 333, 334; 340/765, 784, 811, 794, 805; 352/4, 23.2

[56] References Cited

U.S. PATENT DOCUMENTS

| 4,062,626 | 12/1977 | Kawakami et al. | ................. 350/333 |
| 4,385,292 | 5/1983 | Nonomura et al. | ................. 350/333 |
| 4,386,353 | 5/1983 | Nonomura et al. | ................. 350/333 |
| 4,743,096 | 5/1988 | Wakai et al. | ........................ 350/333 |
| 4,818,077 | 4/1989 | Ohwada et al. | ..................... 350/333 |

FOREIGN PATENT DOCUMENTS 59-119328  1/1984  Japan .

OTHER PUBLICATIONS

K. Smith, "Amorphous Silicon Shows Promise for Flat-Panel T.V. Display"; Electronic, vol. 52, No. 13, pp. 69–70.

Suzuki et al., "A 220 & 240 Pixel a-Si TFT Matrix Transmission Liquid Crystal Display", proceedings of the SID, vol. 28, No. 1, 1984.

European Search Report for Application No. EP 88 10 6159, including pertinent art cited therein.

Primary Examiner—Stanley D. Miller
Assistant Examiner—Huy K. Mai
Attorney, Agent, or Firm—Fay, Sharpe, Beall, Fagan, Minnich & McKee

[57] ABSTRACT

An active matrix liquid crystal display is disclosed in which a better image quality is obtained by specifying a relation between voltages applied to the liquid crystal display. Also, a better holding characteristic is obtained by selecting the channel resistance $R_{OFF}$ of a thin film transistor in its OFF state to be not smaller than $10^{12}\ \Omega$.

11 Claims, 6 Drawing Sheets

LIQUID CRYSTAL DISPLAY AND METHOD OF DRIVING THE SAME

CROSS-REFERENCE TO RELATED APPLICATIONS

Co-pending U.S. patent application No. 183,141 based on Japanese patent application No. 62-95125 filed on Apr. 20, 1987.

BACKGROUND OF THE INVENTION

The present invention relates to an active matrix liquid crystal display and a method of driving the same, and more particularly to such a display and method suitable for the acquisition of a better quality of image.

Figure 1:
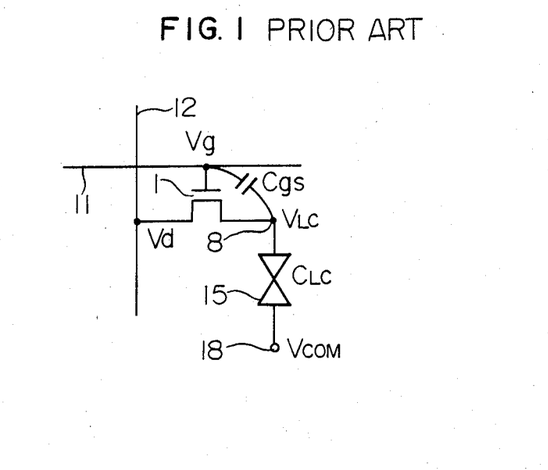
FIG. 1 is an equivalent circuit for one pixel of a liquid crystal display using TFT's.
Figure 2:
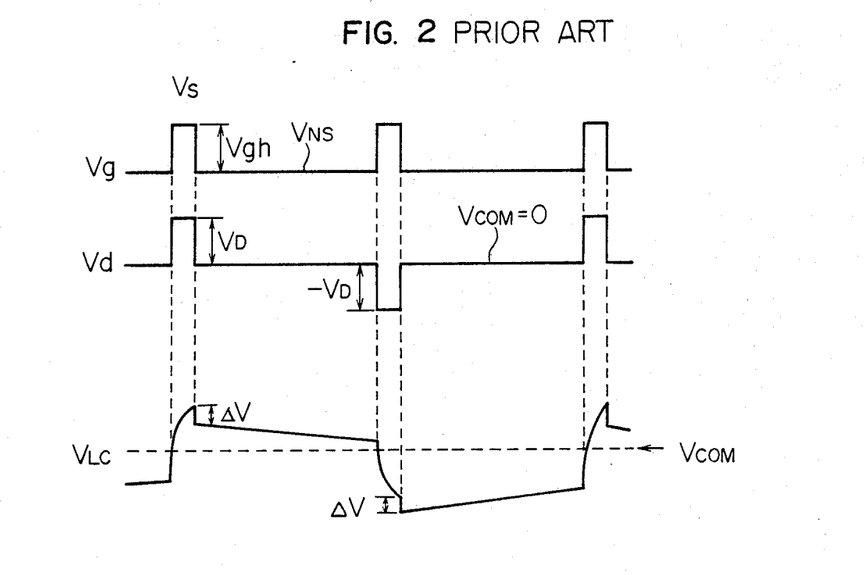
FIG. 2 is a view showing one example of driving waveforms in the TFT liquid crystal display shown in FIG. 1.

FIG. 1 shows an equivalent circuit of for one pixel of a liquid crystal display using insulated gate thin film transistors (hereinafter referred to as TFT's). Now assume that the electric potentials of a gate line 11, a data line 12 and a pixel electrode 8 to which the TFT is connected are $V_g$, $V_d$ and $V_{LC}$, respectively. A layer 15 of liquid crystal sandwiched between the pixel electrode and an opposing substrate having an overall transparent electrode formed on the whole of a surface thereof equivalently forms a capacitance $C_{LC}$. The potential $V_{COM}$ of the opposing substrate is constant. A relation between these potentials or voltages are shown in FIG. 2. For simplification, it is assumed that $V_{COM}=0$ (V). When a selection voltage $V_S$ is applied to the gate of the TFT, the TFT is turned on and hence a drain current flows so that charges are injected into the liquid crystal capacitance $C_{LC}$ and the pixel voltage $V_{LC}$ shortly becomes equal to data $V_D$. Thereafter, the gate voltage becomes a non-selection voltage $V_{NS}$ so that the TFT assumes its OFF state. At this time, the pixel voltage $V_{LC}$ drops by $$\Delta = \frac{C_{gs}}{C_{LC} + C_{gs}} \cdot V_{gh}$$

due to a capacitive coupling of the liquid crystal capacitance $C_{LC}$ and a parasitic capacitance $C_{gs}$ caused from the overlap between the gate and source of the TFT shown in FIG. 1, as disclosed in Japanese patent unexamined publication JP-A-59-119328. Here, $V_{gh}$ is equal to $V_S - V_{NS}$. In the turned-off state of the TFT, the charges stored in the liquid crystal are gradually discharged at a time constant which is determined by the resistance $R_{LC}$ and capacitance $C_{LC}$ of the liquid crystal and the off-resistance $R_{OFF}$ of the TFT. After the selection of the other gate lines or the lapse of one period or cycle, the gate voltage becomes $V_S$ again so that the TFT is turned on. This time, a voltage of $-V_D$ is applied to the data line and the pixel voltage $V_{LC}$ shortly becomes equal to $-V_D$. When the gate voltage becomes $V_{NS}$, a voltage drop of $\Delta V$ as has been described above is produced and thereafter a discharging takes place. In this manner, an alternately inverted voltage is applied to the liquid crystal as shown in FIG. 2. To display an image in a grey scale can be realized by changing $V_D$ between 0 and $V_{DMAX}$.

In the driving method of the conventional liquid crystal display as mentioned above, any relation between the gate voltage and the data signal voltage with a view to acquire a better quality of image has not been clarified at all.

SUMMARY OF THE INVENTION

An object of the present invention is to provide a liquid crystal display satisfying the condition of driving voltages for the acquisition of a better quality of image and to provide a method of driving such a liquid crystal display.

Figure 3:
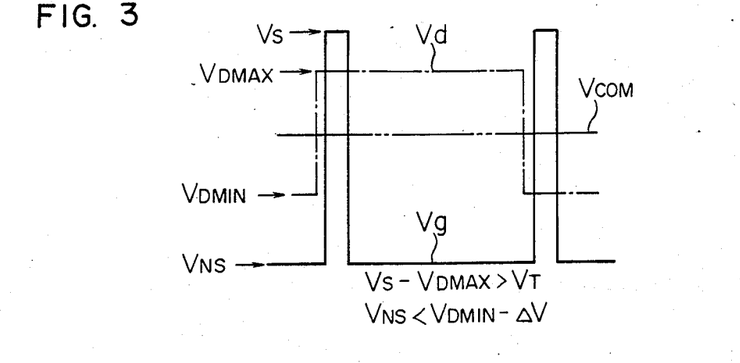
FIG. 3 is a view showing one example of the driving waveforms in a TFT liquid crystal display according to the present invention.

To that end, in a liquid crystal display and a driving method thereof according to the present invention, a gate selection voltage $V_S$ of a TFT and the maximum value of $V_{DMAX}$ of a data signal have a relation of $V_S - V_{DMAX} > V_T$, as is shown in FIG. 3. For the further improvement of the image quality, it is preferable that a gate non-selection voltage $V_{NS}$ and the minimum value $V_{DMIN}$ of the data signal have a relation of $V_{NS} < V_{DMIN} - \Delta V$. Here, $V_T$ is the threshold voltage of the TFT, and $\Delta V$ is a voltage drop which is produced at a pixel portion due to the parasitic capacitance $C_{gs}$ and the liquid crystal capacitance $C_{LC}$ when the TFT is switched from the ON state to the OFF state.

Further, it is preferable that the channel resistance $R_{OFF}$ of the TFT in the OFF state is not smaller than $10^{12}\Omega$. More especially, this channel resistance $R_{OFF}$ not smaller than $10^{12}\Omega$ can be obtained, for example, by forming a better ohmic contact between an electrode and a semiconductor layer to reduce an off-current produced by positive holes.

DESCRIPTION OF THE PREFERRED EMBODIMENTS

The satisfaction of the relation of $V_S - V_{DMAX} > V_T$ for achieving the above-mentioned object of the present invention means that a voltage by which the TFT sufficiently becomes its ON state for all of image signals is applied. Therefore, by satisfying this relation, a sufficient signal writing can be performed.

If in addition to the above-mentioned relation, the relation of $V_{NS} < V_{DMIN} - \Delta V$ is satisfied, the source voltage of the TFT can be prevented from lowering than the gate voltage, thereby realizing a sufficient signal holding without any erroneous turn-on of the TFT.

Further, by selecting the channel resistance $R_{OFF}$ of the TFT in its OFF state to be not smaller than $10^{12}\Omega$, a better holding characteristic can be attained without any auxiliary capacitor, thereby suppressing an inclinatory change of luminance on an image displayed. Such selection of the value of $R_{OFF}$ is effective not only under the above-mentioned requirements for the voltages but also in the other cases.

Embodiment 1

Figure 4:
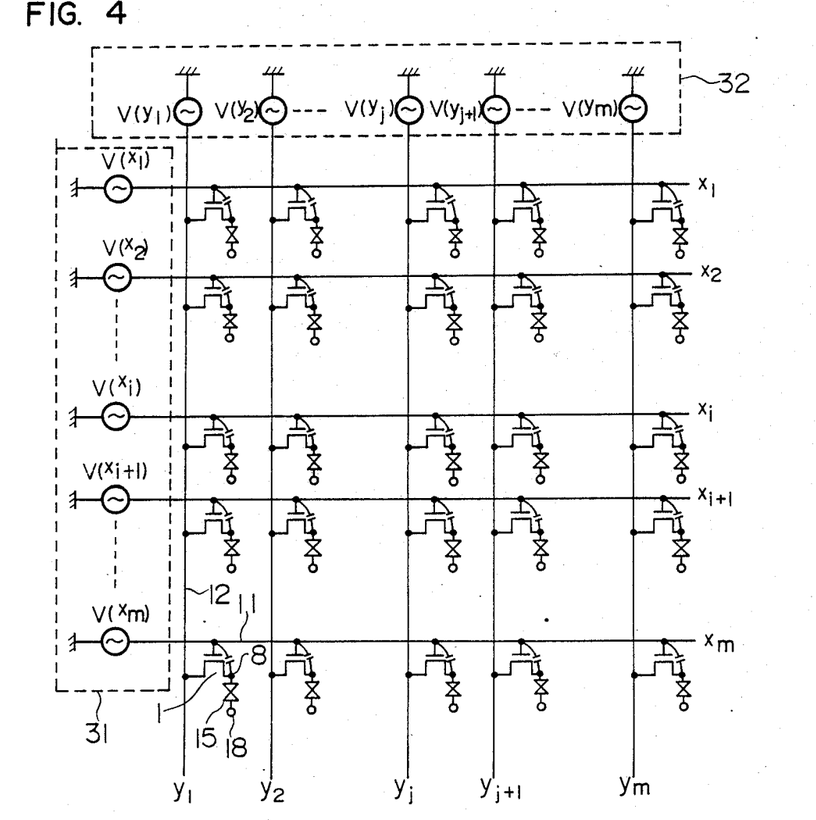
FIG. 4 is a view showing the construction of the whole of a TFT liquid crystal display according to a first embodiment of the present invention.

FIG. 4 shows the whole construction of a TFT liquid crystal display according to a first embodiment of the present invention.

In FIG. 4, reference numeral 11 designates gate lines, and numeral 12 data lines. Numeral 31 designates a gate line driving circuit which applies a gate selection voltage $V_S$ to a selected gate line and a gate non-selection voltage $V_{NS}$ to a non-selected gate line, respectively. Numeral 32 designates a data line driving circuit. The maximum and minimum values of a data line signal voltage applied to each data line are $V_{DMAX}$ and $V_{DMIN}$, respectively.

A driving circuit for one pixel similar to that shown in FIG. 1 is provided at each intersection of the gate lines and the data lines. Also in FIG. 4, numeral 1 designates TFTs, numeral 8 pixel electrodes, and numeral 15 a layer of liquid crystal. Numeral 18 designates an opposing substrate the potential of which is $V_{COM}$.

Figure 5:
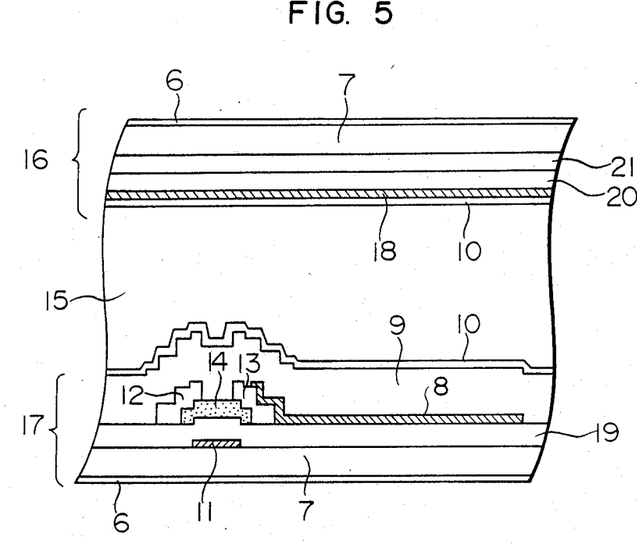
FIG. 5 is a cross-sectional view of a main part of the TFT liquid crystal display shown in FIG. 4.

FIG. 5 shows in cross section a main part of the liquid crystal display of FIG. 4. A TFT substrate 17 includes a TFT portion 1 which is composed of the gate line 11, the data line 12, a source electrode 13 and a semiconductor layer 14 made of amorphous silicon. The TFT substrate 17 further includes the pixel electrode 8, a protection layer 9 and an alignment layer 10. An opposing substrate 16 is provided with an overall transparent electrode 18 and an alignment layer 10. The liquid crystal layer 15 is sandwiched between the TFT substrate 17 and the opposing substrate 16. Reference numeral 6 designates a polarizer or analyzer plate, numeral 7 a glass substrate, numeral 19 a gate insulator film, numeral 20 a color filter layer, and numeral 21 a black matrix layer.

In the above-mentioned liquid crystal display, the threshold voltage $V_T$ of the TFT was 2 V, and the liquid crystal capacitance $C_{LC}$ and the parasitic capacitance $C_{gs}$ associated with the overlap between the gate and source of the TFT were 0.5 pF and 0.1 pF, respectively.

Figure 6:
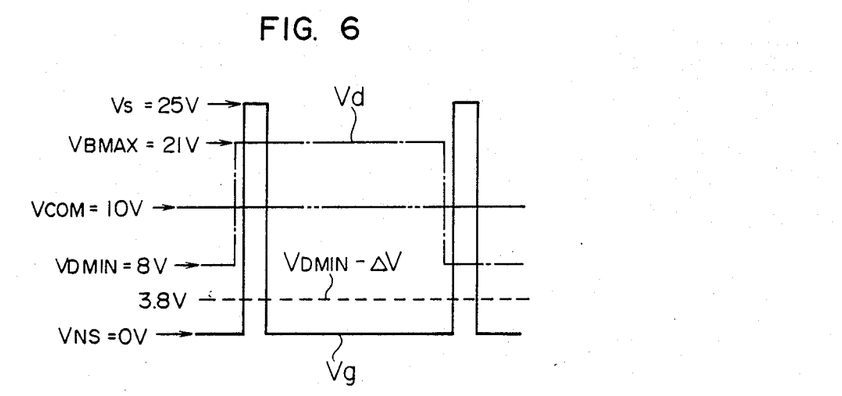
FIG. 6 is a view showing the driving waveforms in the TFT liquid crystal display shown in FIG. 4.

As the driving voltages for this liquid crystal display, the gate voltage including the gate selection voltage $V_S=25$ (V) and the gate non-selection voltage $V_{NS}=0$ (V) was applied to the gate lines 11, and the data line signal having the maximum value $V_{DMAX}=21$ (V) and the minimum value $V_{DMIN}=8$ (V) was applied to the data lines. The potential $V_{COM}$ of the transparent electrode 18 in the opposing substrate 16 was 10 V. The waveforms of these driving voltages are illustrated in FIG. 6.

In the present embodiment, $V_S-V_{DMAX}$ is $25-21=4$ (V) which is larger than $V_T=2$ (V). Namely, the condition of $V_S-V_{DMAX}>V_T$ for sufficiently bringing the TFT to its ON state is satisfied.

Further, the voltage drop $$\Delta V = \frac{C_{gs}}{C_{LC} + C_{gs}} \cdot (V_S - V_{NS})$$

at the pixel portion upon turn-off of the TFT is $$\frac{0.1}{0.5 + 0.1} \times 25 = 4.2 \, (V).$$

Accordingly, $V_{DMIN}-\Delta V$ is $8-4.2=3.8$ (V) which is larger than $V_{NS}=0$ (V). Namely, the condition of $V_{NS}<V_{DMIN}-\Delta V$ for preventing any erroneous turn-on of the TFT is satisfied.

Embodiment 2

Figure 7:
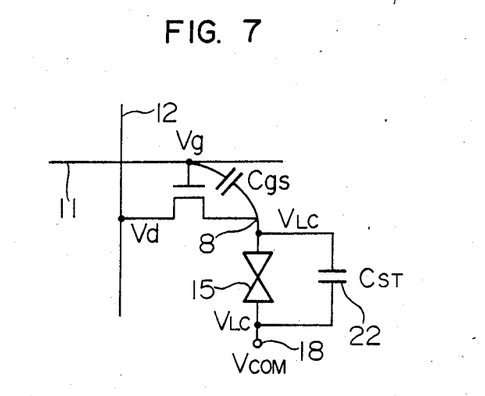
FIG. 7 is an equivalent circuit for one pixel of a TFT liquid crystal display according to a second embodiment of the present invention.

A second embodiment of the present invention will be explained by use of FIGS. 7 and 8. In the present embodiment, an auxiliary capacitor ($C_{ST}$) 22 is added as shown in FIG. 7 in order to make $\Delta V$ small. In this case, the voltage jump (or the voltage drop) at the pixel portion due to the transition from the ON level of the gate voltage to the OFF level thereof is represented by $$\Delta V = \frac{C_{gs}}{C_{gs} + C_{LC} + C_{ST}} \cdot V_{gh}.$$

Figure 8:
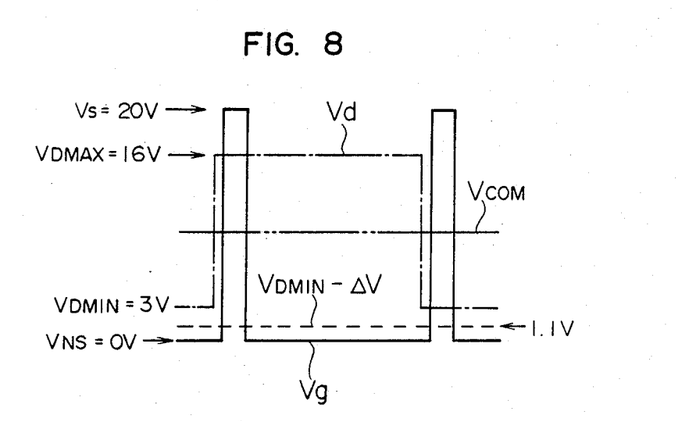
FIG. 8 is a view showing the driving waveforms in the TFT liquid crystal display shown in FIG. 7.

When the auxiliary capacitor $C_{ST}$ having a value of 0.5 pF is equivalently applied, the voltage drop $\Delta V$ is 1.9 V in the case of the driving voltages as shown in FIG. 8, namely, $V_S=20$ (V), $V_{NS}=0$ (V), $V_{DMAX}=16$ (V) and $V_{DMIN}=3$ (V). As a result, the driving which satisfies the voltage requirements in the present invention is possible. In the present embodiment, the potential $V_{COM}$ of the transparent electrode was 7.5 V. In accordance with this embodiment, the amplitude of the gate electrode can be decreased to 80% of that in the first embodiment, thereby allowing a low power loss.

Though in the above-mentioned embodiments the relation of $V_S-V_{DMAX}>V_T$ and the relation of $V_{NS}<V_{DMIN}-\Delta V$ are both satisfied, it is of course that a better image quality can be obtained even by only the former relation. In the disclosed embodiments, by adding the latter relation, an additional effect of preventing any cross-talk resulting from an erroneous turn-on of the TFT is provided, thereby further improving the image quality.

The present invention is never limited to the above-mentioned embodiments. More especially, the conditions or requirements of the driving voltages according to the present invention is applicable to any combination of the parasitic capacitance $C_{gs}$, the liquid crystal capacitance $C_{LC}$ and the threshold voltage $V_T$ (and the auxiliary capacitor $C_{ST}$).

Embodiment 3

The present or third embodiment is the case where the channel resistance $R_{OFF}$ of the TFT in its OFF state is made not smaller than $10^{12}\Omega$.

Figure 9A:
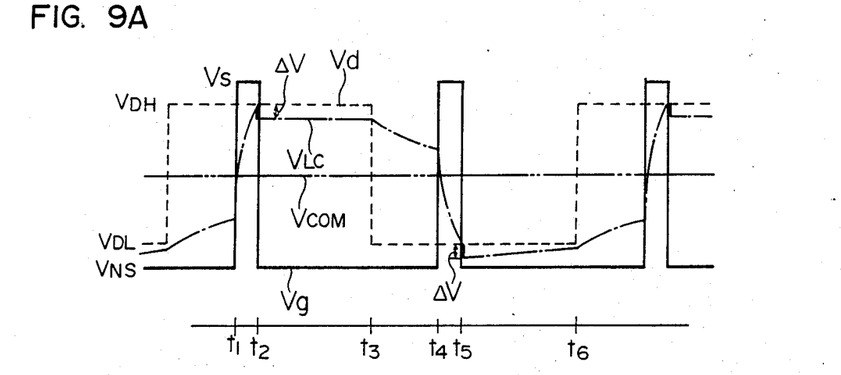
FIGS. 9A to 9C are views showing the driving waveforms for explaining a third embodiment of the present invention.

As has been mentioned at the section of BACKGROUND OF THE INVENTION, in the turn-off state of the TFT, charges stored in the liquid crystal are gradually discharged at a time constant which is determined by the resistance $R_{LC}$ and capacitance $C_{LC}$ of the liquid crystal and the off-resistance $R_{OFF}$ of the TFT. At instant of time $t_3$ in FIG. 9A, the voltage of the data line is changed to $V_{DL}$ and a voltage between the drain and source of the TFT becomes large after this instant of time so that a leakage current through $R_{OFF}$ becomes much larger. At instant of time $t_4$ at which the selection of the other gate lines has been completed or one period has elapsed, the gate voltage becomes the selection voltage $V_S$ again so that the TFT is turned on. This time, a data voltage $V_{DL}$ having a reverse polarity with respect to $V_{COM}$ is written into the pixel electrode. The above applies correspondingly to a change in voltages after this time.

Figure 9B:
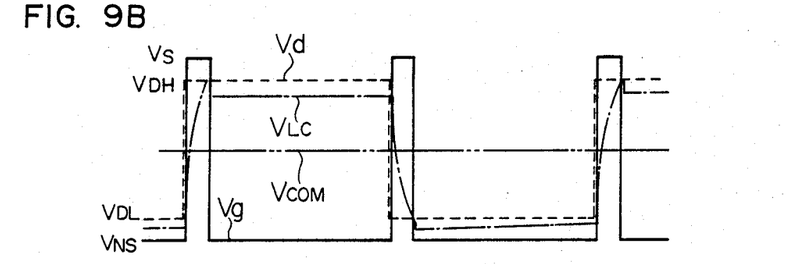
Figure 9C:
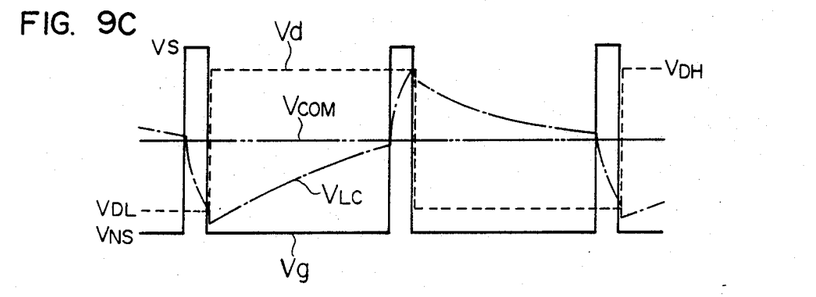

As is apparent from the above explanation of driving, the discharge of charges from the pixel electrode through the off-resistance $R_{OFF}$ of the TFT is greatly influenced by a difference in potential between the pixel electrode and the data line. The effect of discharge is the smallest when a relation in timing between the data voltage and the gate voltage is as shown in FIG. 9B. This case is called the best condition. In the case of the timing shown in FIG. 9C, the effect of discharge is the greatest. This is called the worst condition. Usually, FIG. 9B is one example of the driving voltage waveforms at the upper portion of an image displayed and FIG. 9C is the driving waveforms at the lower portion of the image displayed. The effective voltage applied to the liquid crystal layer in the case of FIG. 9C is small as compared with that in the case of FIG. 9B. As a result, an inclinatory change of luminance occurs on the liquid crystal display extending over the upper portion of the displayed image and the lower portion thereof. One direct method of reducing the discharge or current leakage at the OFF state of the TFT is to use the auxiliary capacitor $C_{ST}$ as shown in FIG. 7 in conjunction with the second embodiment.

The present or third embodiment provides a condition capable of solving the above-mentioned problem without using the auxiliary capacitor $C_{ST}$. An ohmic contact to the amorphous silicon (a-Si) layer of the TFT is formed by P (phosphorus) doped n+ amorphous silicon. In the present embodiment, it is important to form a better interface between the n layer and the i layer, thereby sufficiently suppressing the injection of positive holes, as will be shown hereinbelow.

Figure 10:
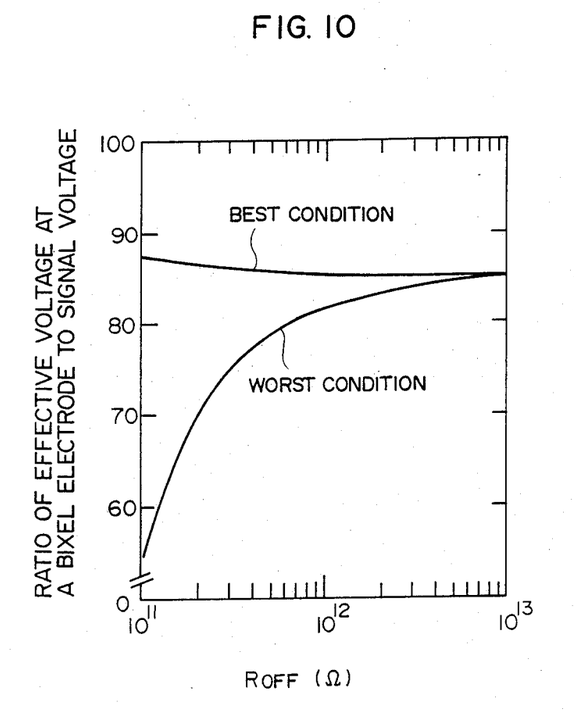
FIG. 10 is a view showing a relation between the off-resistance of a TFT and the ratio of effective voltage at a pixel electrode to signal voltage.

The ratio of the effective voltage to the signal voltage, i.e. the holding ratio when the liquid crystal display is driven at the best and worst conditions as shown in FIGS. 9B and 9C, is shown in FIG. 10 for the values of the off-resistance $R_{OFF}$ of the TFT as taken a parameter. It is seen that a sufficient holding characteristic can be obtained at the values of $R_{OFF}$ not smaller than $10^{12}\Omega$. That the ratio of effective voltage at a pixel electrode to signal voltage is fixed to 85% at the values of $R_{OFF}$ which are sufficiently large, is based on the self-discharge of the liquid crystal used.

According to the present embodiment, since a leakage current in the OFF state of the TFT can be suppressed by selecting the off-resistance $R_{OFF}$ of the TFT to be not smaller than $10^{12}\Omega$, a liquid crystal display having a better image quality can be realized without using any auxiliary capacitor.

We claim:
1. A liquid crystal display comprising:
a first substrate including thereon a plurality of data lines, a plurality of gates lines crossing said data lines, a plurality of pixel electrodes disposed at respective crossing portions of said data lines and said gate lines, and a plurality of insulated gate thin film transistors disposed at said crossing portions, each of said thin film transistors being connected between an associated one of the pixel electrodes and an associated one of the data lines and having a gate connected to an associated one of the gate lines, wherein the each of said transistors is turned on when a gate voltage higher than a predetermined threshold value is applied to the gate;
a second substrate facing to said first substrate and including a transparent conductor formed on its surface;
a layer of liquid crystal sandwiched between said first and second substrates so as to provide pixels at the respective crossing portions in cooperation with said pixel electrodes;
means for selectively applying a data voltage to each of said data lines; and,
means for selectively applying a gate voltage to each of said gate lines, said gate voltage being higher than a sum of a maximum value of the data voltage and the threshold value for the gate voltage.
2. A liquid crystal display according to claim 1, wherein a value of the gate voltage to turn said thin film transistor off is smaller than the subtraction of the value of the voltage drop at the pixel electrode upon transition from an ON state of said thin film transistor to an OFF state thereof from the minimum value of said data signal voltage.
3. A liquid crystal display according to claim 1 wherein a channel resistance of each of said thin film transistors in its OFF state is not smaller than $10^{12}\Omega$.
4. A liquid crystal display according to claim 3, wherein each of said thin film transistors is an amorphous semiconductor transistor.
5. The liquid crystal display as set forth in claim 1, wherein the plurality of gate lines crossing said data lines do so in a perpendicular arrangement.
6. A liquid crystal display comprising:
a first substrate including thereon a plurality of data lines, a plurality of gate lines perpendicular to said data lines, a plurality of pixel electrodes disposed at respective crossing portion of said data lines and said gate lines, a plurality of insulated gate thin film transistors disposed at said crossing portions, and a second substrate facing said first substrate each of said thin film transistors having two electrodes connected respectively to an associated one of the pixel electrodes and an associated one of the data lines, the transistors further having a gate connected to an associated one of the gate lines passing said associated crossing portion so that conduction of the transistor is controlled by a gate voltage applied through the gate line to said gate, wherein each of the transistors has a channel resistance not smaller than $10^{12}\Omega$ between the two electrodes, when the transistor is turned off, whereby a layer of liquid crystal sandwiched between said first and second substrate so as to provide pixels at the crossing portions in cooperation with said pixel electrodes, is controlled by the associated pixel electrode to which a data voltage is applied through the associated transistor, when it is turned on, from the data line connected thereto.
7. A liquid crystal display according to claim 6 wherein, each of said thin film transistors is an amorphous semiconductor transistor.
8. A method of driving a liquid crystal display wherein the display comprises a first substrate including thereon a plurality of data lines, a plurality of gate lines crossing said data lines, a plurality of pixel electrodes disposed at respective crossing portions of said data lines and said gate lines, and a plurality of insulated gate thin film transistors disposed at said crossing portions, each of said thin film transistors being connected between an associated one of the pixel electrodes and an associated one of the data lines, the each transistor further having a gate connected to an associated one of the gate lines passing said associated crossing portion, wherein the each of said transistors is turned on when a gate voltage higher than a predetermined threshold value is applied to its gate; a second substrate facing to said first substrate and including a transparent conductor formed on its surface; a layer of liquid crystal sandwiched between said first and second substrates so as to provide a plurality of pixels at the respective crossing portions in cooperation with said pixel electrodes; means for selectively applying a data voltage to each of said data lines, and means for selectively applying a gate voltage to each of said gate lines, said method comprising the steps of:

applying a data voltage having a value between a predetermined maximum and minimum value to the associated one of said data lines; and, applying a gate voltage having a value higher than a sum of the maximum value of the data voltage and the predetermined threshold value for the gate voltage to the associated one of said gate lines for turning on the transistor.

9. A method according to claim 8, further comprising the step of, when a one of the plurality of transistors is to be turned off, applying to the gate of the one transistor through the gate line connected thereto a gate voltage having a value smaller than the subtraction of the value of a voltage drop at the pixel electrode connected to the transistor upon transition from an ON state of said thin film transistor to an OFF state thereof from the minimum value of said data signal voltage.

10. The method of driving a liquid crystal display as set forth in claim 8, wherein the plurality of gate lines crossing said data lines do so in a perpendicular arrangement.

11. A method of driving an active matrix liquid crystal display including a thin film transistor switching element disposed at a pixel electrode of the display, the electrode being generally disposed at each of a plurality of crossing portions of data lines and gate lines of the display, the method comprising the steps of:

applying to each of the data lines a data voltage ($V_D$) predetermined to be within a voltage range between a maximum ($V_{Dmax}$) and minimum ($V_{Dmin}$) for driving the pixel electrode, said voltage being determinative of selected pixel gray scale intensity;

scanning the gate lines during a selection period with a select gate voltage ($V_s$) having a value greater than a sum of a transistor gate threshold voltage ($V_T$) and the maximum data voltage ($V_{Dmax}$), and during a non-selected period with a non-select gate voltage ($V_{NS}$) having a value less than the minimum data voltage ($V_{Dmin}$) minus a voltage drop ($\Delta V$) at the pixel electrode upon transistor transition from an ON state to an OFF state, whereby improved pixel picture quality results by maintaining the pixel electrode at the data voltage during non-selection periods.

* * * * *